United States Patent [19]

Inoue

[11] 4,335,436
[45] Jun. 15, 1982

[54] MICROPROCESSOR-CONTROLLED EDM SYSTEM

[75] Inventor: Kiyoshi Inoue, Tokyo, Japan

[73] Assignee: Inoue-Japax Research Incorporated, Yokohama, Japan

[21] Appl. No.: 101,080

[22] Filed: Dec. 7, 1979

[30] Foreign Application Priority Data

Dec. 8, 1978 [JP] Japan ............................... 53-152500
Dec. 12, 1979 [JP] Japan ............................... 53-154522

[51] Int. Cl.³ .......................... G06F 15/46; B23P 1/08
[52] U.S. Cl. ................................. 364/474; 219/69 C; 219/69 G; 219/69 M; 364/477; 364/179
[58] Field of Search .............. 364/474, 475, 477, 107, 364/581, 111, 112; 219/69 G, 69 C, 69 M

[56] References Cited

U.S. PATENT DOCUMENTS

| | | | |
|---|---|---|---|
| 3,824,387 | 7/1974 | Garst | 364/112 X |
| 3,851,157 | 11/1974 | Ellis | 364/581 X |
| 4,045,641 | 8/1977 | Ullmann et al. | 364/474 X |
| 4,057,703 | 11/1977 | Pfau | 219/69 G X |
| 4,071,729 | 1/1978 | Bell, Jr. | 364/474 X |
| 4,078,163 | 3/1978 | Bell, Jr. et al. | 364/474 X |
| 4,135,070 | 1/1979 | Pfau et al. | 219/69 G X |
| 4,161,782 | 7/1979 | McCracken | 364/112 X |

FOREIGN PATENT DOCUMENTS

| | | | |
|---|---|---|---|
| 1454088 | 10/1976 | United Kingdom | 364/474 |
| 1527654 | 10/1978 | United Kingdom | 364/474 |
| 1536127 | 12/1978 | United Kingdom | 364/474 |

*Primary Examiner*—Joseph F. Ruggiero
*Attorney, Agent, or Firm*—Karl F. Ross

[57] ABSTRACT

An EDM parameter control system comprising a microprocessor having a memory for storing therein a programmed set of microinstructions representing selectable values for each of the EDM parameters. A gap monitoring circuit derives from the EDM gap a gap status signal representing characteristics thereof, the gap status signal being applied through an input interface to the microprocessor wherein it is used to microprocess the previously stored parameter data to provide control signals applicable to respective control devices for regulating the machining parameters (e.g. machining pulse on-time and off-time, gap spacing, tool reciprocation commands, dielectric supply control parameters). Preferably, the parameters are weighted in microprocessing and the output interface is constituted by a time-sharing unit for actuating the control devices in preset time divisions.

8 Claims, 7 Drawing Figures

MICROPROCESSOR-CONTROLLED EDM SYSTEM

FIELD OF THE INVENTION

The present invention relates to electrical discharge machining and, more particularly, to a microprocessor-controlled EDM system adapted to optimally perform a plurality of control operations in electrical discharge machining.

BACKGROUND OF THE INVENTION

In EDM, a tool electrode in the form of a three-dimensionally shaped solid body (i.e. sinking-type EDM) or a continuous wire or like elongated body (wire-cut EDM) is juxtaposed with a workpiece across a machining gap filled with a machining fluid or liquid dielectric (e.g. kerosene, transformer oil, distilled water or weakly conductive water). Electric energy in the form of discrete electrical pulses are supplied across the fluid-filled machining gap to effect a succession of electrical discharges between the tool electrode and the workpiece to remove material from the latter. As material removal proceeds, the tool electrode is advanced relatively toward the workpiece by servofeed means adapted to maintain the machining gap spacing substantially constant thereby to allowing material-removal discharges to be successively created. For example, in wire-cut (WC) EDM, also called traveling-wire (TW) EDM, the workpiece may be displaced along a predetermined cutting path in a plane transverse to the axis of the continuously axially moving traveling-wire electrode under numerical control (NC). In sinking-type EDM, the tool electrode may be advanced in the direction of its axis or along the Z-axis and additional relative movements may be imparted to the tool electrode and the workpiece in an X-Y plane orthogonal to the Z-axis to generate a cavity in the workpiece.

Parameters of individual and successive electrical discharges, i.e. pulse on-time ($\tau$on), peak current (Ip) and off-time ($\tau$off), are determinative of machining results, e.g. removal rate, surface roughness and relative electrode wear and, therefore, are individually or in combination particularly adjusted to establish a particular machining condition suitable for achieving desired machining results.

The contamination of the machining gap region with chips, tar and gases produced by machining discharges may be removed by continuously or intermittently flushing the gap with the fresh machining fluid and/or intermittently or cyclically retracting the tool electrode away from the workpiece to allow the fresh machining medium to be pumped into the machining gap and the machining contaminants to be carried away from the latter.

In order to increase the removal rate, it is also desirable to operate the electrode-feed servocontrol system so as to minimize production of non-striking pulses or pulses which do not cause discharge. The gap spacing can accordingly be reduced but this can also facilitate production of an continuous arc or result in difficulty in gap flushing or decontamination. The attempt to facilitate machining discharges tends to drop the removal rate while the setting of the servo system so as to widen the threshold gap spacing leads to an increased frequency of non-striking pulses.

As noted above, the critical parameters involved in EDM include, apart from the electrode and workpiece materials and dielectric compositions, machining pulse parameters, dielectric supply, gap spacing and gap decontamination. In addition, especially in WC-EDM or TW-EDM, the wire axial transport velocity, the dielectric resistivity and temperature, and the workpiece thickness must be controlled or, for control purposes, be strictly taken into consideration. Control can respond to monitoring the status or machining condition in the EDM gap in which machining is in progress. Because of instantaneous and constant change, however, that the gap must experience in the EDM process, it has long been recognized in the art that it is extremely difficult to perform control operations for these parameters in combination in a manner to yield optimal results for varying machining requirements. The difficulty arises from the fact that the EDM process involves extremely complex phenomena and the parameters which govern the process are mutually interrelated in highly complicated ways over extensive ranges.

It should also be noted that with ever increasing resort to industry in recent years there have been imposed increasingly diverse complex operational requirements on an EDM equipment. To meet these requirements, therefore, it has become mandatory that a machine be equipped with highly complicated and excessively costly and massive control circuits.

OBJECTS OF THE INVENTION

It is, accordingly, an important object of the present invention to provide an improved EDM parameter control method and apparatus whereby difficulties hitherto encountered in the individual control of diverse interrelated machining parameters in an EDM machine are overcome.

Another object of the present invention is to provide an improved EDM parameter control system which can readily and inexpensively be adapted to an existing EDM machine tool to meet diverse machining requirements and capabilities.

SUMMARY OF THE INVENTION

In accordance with the present invention there is provided a method of controlling a plurality of different and mutually independent EDM machining parameters, comprising the steps of electrically deriving from an EDM gap a gap status signal representing a measure of the progress of electrical discharge machining in the gap, applying the gap status signal through an input interface to a microprocessor having a memory unit in which programmed information relative to the plurality of EDM parameters is stored, processing the programmed information with the gap status signal in said microprocessor to provide a plurality of control signals, and applying the control signals through an output interface to control devices for regulating said EDM parameters.

An apparatus for controlling EDM parameters in accordance with the present invention comprises monitor means electrically connected to an EDM gap for providing a gap status signal representing a measure of electrical discharge machining in the gap, a microprocessor having an input interface for receiving the gap status signal, a memory unit for storing a predetermined programmed information relative to a plurality of EDM parameters and an arithmetic and logic unit for processing the programmed information with the received gap status signal to provide control signals, and an output interface associated with the microprocessor for transmitting the control signals to respective control devices for regulating the EDM parameters.

SPECIFIC DESCRIPTION

Figure 1:
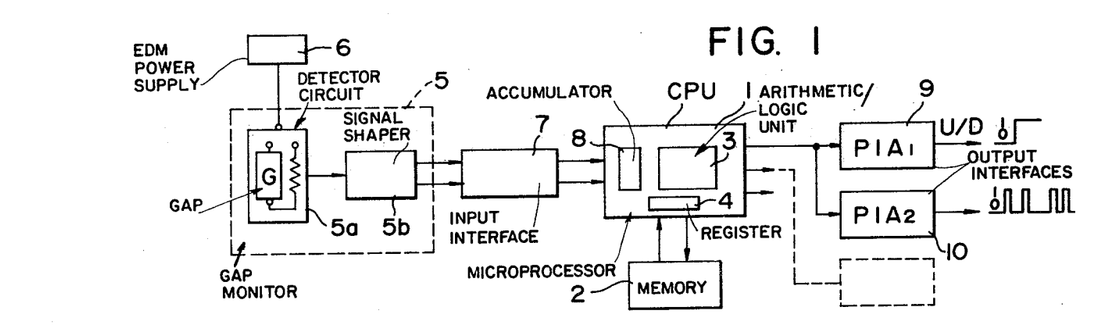
FIG. 1 is a functional block diagram illustrating a control system embodying the present invention.

Referring to FIG. 1, an EDM parameter control system embodying the present invention incorporates a microprocessor or central processing unit (CPU) 1 equipped with memory elements 2 comprising tyically read-only-memory (ROM) and read/write memory (R/WM) devices. The memory unit 2 has a predetermined set of micro-instructions or numerical data stored therein with respect to one or more EDM parameters to be controlled, i.e. EDM gap spacing, machining pulses, machining fluid supply and so forth.

Figures 2, 3, 5:
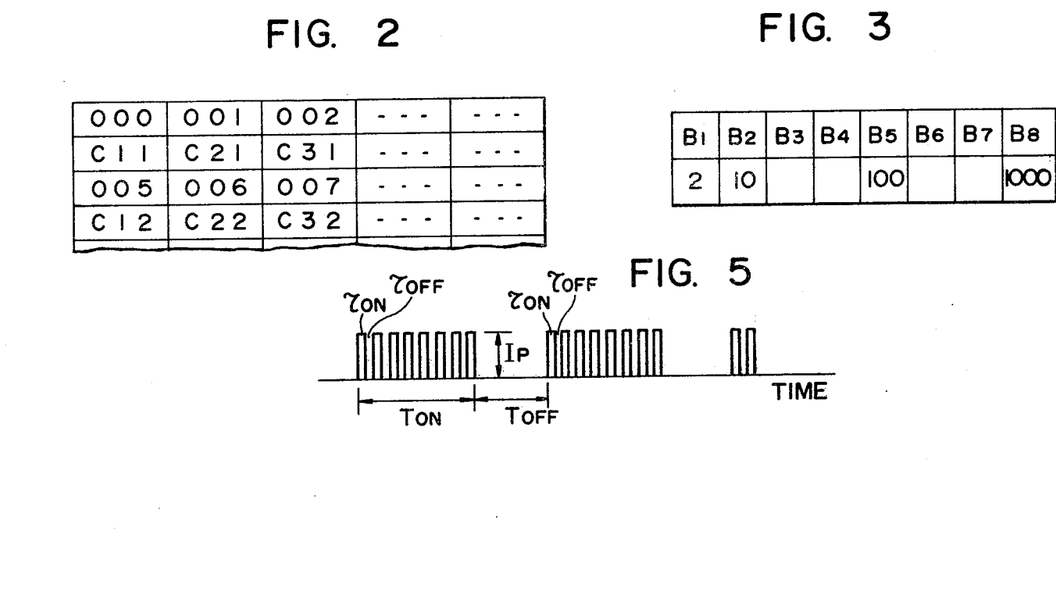
FIG. 2 is a schematic diagram illustrating an arrangement of instruction words stored in successive addresses in a memory in the control system of FIG. 1.
FIG. 3 is a schematic diagram illustrating the structure of a particular instruction word in the memory in the system of FIG. 1.
FIG. 5 is a waveform diagram illustrating a succession of EDM pulses which may be employed in conjunction with a control system of the present invention.

FIG. 2 shows the arrangement of programmed instructions or words stored in the memory 2. It is shown that words C11, C21, C32,-are programmed in successive addresses 000, 001, 002,-, 005, 006, 007,-in the memory 2. The readout of these words can be accomplished in the order of successive addresses or in any other order desired.

For implementation of the instructions, the addresses can be set for a program counter so that for each count the latter accumulates, the CPU performs readout. Accomplishment of a given instruction set causes the program counter to increase its content and induce the next addressing step for data to be retrieved as subsequent instructions to advance processing.

FIG. 3 shows an example of data structure programmed in the memory unit 2 for controlling the EDM gap spacing or machining feed. The data shown comprise eight bits wherein the numbers of feed drive pulses to be set are assigned as B1=2, B2=10,-, B8=1000. The eight bits are read out in parallel with one another and the divided data appear respectively at the corresponding data buses connected to an arithmetic and logic unit (ALU)3 in the CPU1 and are transferred to a register 4 therefor. A predetermined bit is thus chosen by data processing.

The control system of FIG. 1 is also fed through a monitoring unit 5 with numerical data from a EDM gap G which is formed between a tool electrode, e.g. wire electrode or a solid three-dimensional electrode, and a workpiece machined thereby. The gap G is shown having an EDM power supply 6 of any conventional design connected to the gap to apply a succession of machining pulses therethrough. The monitoring unit 5 comprises a gap detector circuit 5a connected to the gap G for sensing one or more gap electrical variables such as gap voltage, current and impedance and a discriminator or signal shaping circuit 5b for shaping the detected gap signal. The gap signal sensing circuits 5a and 5b may be of any suitable conventional configuration and may make use of an arrangement disclosed, for example, in U.S. Pat. No. 3,997,753 issued Dec. 14, 1976, U.S. Pat. No. 4,005,303 issued Jan. 25, 1977, or U.S. Pat. No. 3,987,269 issued Oct. 19, 1976. The signal from the gap monitoring unit 5 characterizing the status or progress of electrical machining in the EDM gap is passed through an interface unit 7 and applied as numerical data to the CPU 1.

In the CPU1, the gap numerical data are stored in an accumulator 8 and data processing is effected on the contents of the aforementioned register 4 and the accumulator 8. The result is input to the accumulator 8 and control outputs are developed at a plurality of output interfaces or peripheral interface adapters (PIA's) for controlling the EDM process. Two such interfaces or adapters 9 and 10 are shown and may provide electrode up/down feed commands and drive pulse commands, respectively.

Figure 4:
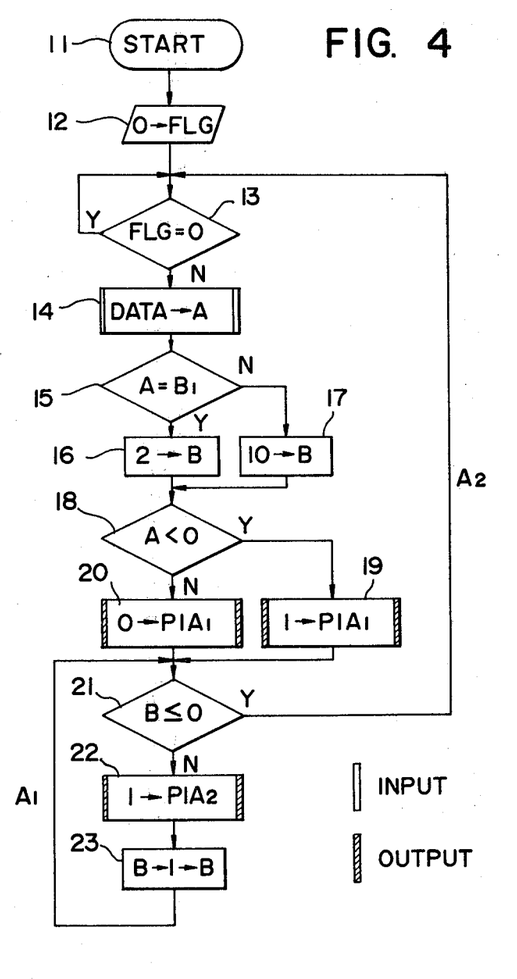
FIG. 4 is a flow chart of certain automatic operations executed by the system of FIG. 1.

The flow chart shown in FIG. 4 lists functional steps involved in the operation of the system of FIG. 1 for EDM gap control with a given procedural step executed in each block. The operation commences at a block 11 to actuate the system. In block 12 the flag bit FLG is cleared to advance to block 13 where it is inquired if FLG=0. If machining is in progress at the EDM gap G, the negative NO (N) is answered and otherwise the positive YES (Y) outputs.

When NO is the answer, the system is allowed to advance to block 14 to permit the machining data from the gap monitoring unit 5 to be memorized in the accumulator 8. In the subsequent block 15 it is questioned if the data input to the accumulator 8 or the data A is equal to the minimum B1(=2) of bits transferred from the memory 2. If A=B1, the output Y is issued and the system is advanced to block 16 to allow the B1=2 to be memorized in the register 4. If A≠B1 or N is the output, other bits B2,-B8 are compared sequentially and the coincident bit, say B2(=10), is selected for memorization in block 7.

After set-up of the coincident bit, the operation proceeds to block 18 where the polarity of datum A is questioned. If A<0, the output Y issues to permit, in block 19, a signal "1" to be developed at the output interface 9. This signal indicates that the spacing between the tool electrode and the workpiece at the gap G has been reduced less than a preselected threshold. Then, the signal may serve as a gap UP signal to cause the electrode to be retracted to increase the gap spacing.

If A≧0, the answer N reaches block 20 to cause the output interface 9 to develop an "0" signal which may serve as a gap DOWN signal to allow the electrode to be advanced to reduce the gap spacing.

In the next block, block 21, the inquiry is whether the data in the register 4 becomes 0 or B≦0. In the negative, the system proceeds to block 22 where a command pulse is issued from the second output interface 10 to reduce the gap spacing. An electrode drive unit (not shown) is provided which may operate either in a digital or analog mode by means of a pulse motor, electrical servomotor or hudraulic servomotor system.

The output of block 22 advances to block 23 to step down the register 4 for the bits B and then is fed back to block 21 along a loop A1. As long as the block 22 provides the negative answer A, the output interface 10 continues to provide command pulses.

The command pulses of the interface 10 continue to be furnished until $B \leq 0$ when the operation along the loop A1 is halted. Thus, the second peripheral interface 10 furnishes the number of pulses corresponding to the given bit $B1=2$ to $B2=10$ memorized in block 16, 17 in accordance with the input data A. It follows that a particular bit is selected depending upon the input magnitude and this results in a weighted control for a machining parameter to allow the machining status or progress in the gap to be improved rapidly and in an optimum mode. Weighting with further increased steps is, of course, attained by increasing the number of bits for choice.

The block 21 is shown having an additional output which, when $B \leq 0$, issues the answer Y which is fed back to the block 13 along loop A2 to command that new data be taken from the machining gap.

In this manner the control system disclosed operates by constantly monitoring change in the gap status and data continuously derived from the machining gap representing the gap status is microprocessed in the CPU 1. The weighted microprocessing by CPU 1 provides output signals which are directly applied to operate control devices to regulate the EDM gap. A constantly stable and optimal control thus ensues.

Various conventional control units other than the servo-control unit described may be placed under control of the present system. Typical is an electrode reciprocating unit designed to operate by intermittently retracting the tool electrode to increase the chip-accumulated machining gap and to wash away the contaminants from the gap with the pumping action. Such device may be combined with the servo unit for control in response to the monitoring the discharge status in the machining gap.

Likewise, parameters for machining pulses as well as those for a machining fluid supply can be controlled.

An EDM power supply comprises a DC source and a power switch connected in series with the DC source and the machining gap and may advantageously be designed to provide across the latter pulse trains individually consisting of elementary pulses of predetermined peak current Ip, on-time $\tau$on and off-time $\tau$off, the pulse trains having a duration Ton with the successive trains being separated by a cut-off time interval Toff, as generally illustrated in FIG. 5. To this end, a control or gating circuit for the switch and the output constitutes a system element to be acted upon in response to the discharge condition. It is necessary that the pulse-train duration Ton be regulated to establish a particular machining condition ranging from finishing and roughing operations. The cutoff time interval Toff acts to clear an arcing or short-circuiting condition which may develop at the machining gap and also to permit the gap contaminants to be carried away. These parameters and sometimes also the peak current Ip, pulse on-time $\tau$on and off-time $\tau$off are desirably controlled sequentially as the machining conditions are to be altered and also in consideration of electrode materials and machining configurations.

Thus, advantageously the train duration Ton can be successively increased within a given range so that a normal machining state may be maintained in the machining gap. If any abnormality appears, the duration Ton can be decreased successively. A modified program can be kept to be applied so that a maximum value of the duration Ton may be constantly approached. An optimal value of the cut-off time interval Toff for change in the opposite directions is likewise determined.

In the program control of the system, instead of incremental stepup or stepdown of selected values for a given machining parameter, certain analytical results of input data may enable skipping over two or three progressive steps in accordance with a correspondingly weighted control program to gain an accelerated achievement of a desired condition.

Data previously appointed are all stored in the memory 2 for successive retrieval by CPU 1 which analyzes and processes the contents of imputs received from the machining gap to provides a desired number of commands successively to the aforementioned gate circuit and other control units so that an optimum gap condition may be established.

For example, if the regulation of pulse interruption Ton, Toff proves to be insufficient to remove the accumulation of machining chips in the gap, the tool reciprocation will be strengthened which acts to effectively enlarge the gap spacing to allow the decontaminants to be sufficiently carried away. The insufficient removal of the gap contaminants can also be overcome by strengthening the machining fluid supply. These multiple interdependent control operations are performed optionally under the judgment of CPU 1 to enable a desired machining job to be achieved with ultimate precision and in a minimum of time.

Figure 6:
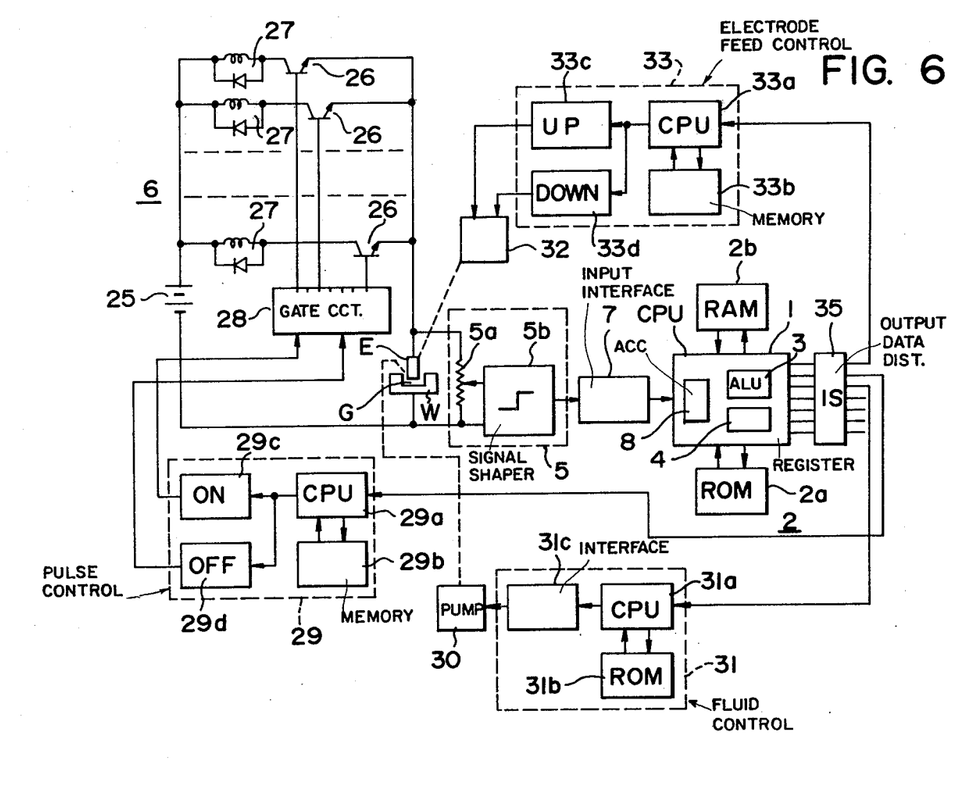
FIG. 6 is a functional block diagram illustrating another form of the control system according to the present invention applied to EDM power supply and control equipment.

In FIG. 6 there is shown a microprocessing control system of the present invention as applied to various control elements in conventional EDM equipment having a power supply connected to the EDM gap G formed between the tool electrode E and the workpiece W. As previously mentioned, the power supply 6 includes a DC source shown here at 25 and a power switch here shown as a bank of power transistors 26 connected in parallel with one another between the DC source 25 and the machining gap G, each in series with a parallel network 27 of a choke and a unidirectional current conducting element. The transistors 26 are energized by a common gate circuit 28 having a pulse parameter control device 29 to periodically switch the transistors 26 on and off and, hence, to apply across the EDM gap a succession of machining pulses with controlled on-time and off-time.

A pump for controlledly supplying a machining fluid, e.g. kerosene or distilled water, to the machining gap G is shown at 30 and operated by a control device 31. A electrode feed servo-control unit 7 is shown at 32 and operated by a control device 33.

As previously described, the control system of the present invention has the microprocessor or central processing unit (CPU)1 fed with a control input through the monitoring unit 5 comprising the gap detector circuit 5a and the signal shaping network 5b. The memory unit for CPU 1 comprises ROM and read-/write memories which are shown at 2a and 2b, respectively. The gap status signal derived by the monitoring unit 5 is fed to CPU 1 via the interface unit 7 which converts it to the numerical form or processable digital signals as previously described.

The data input through the interface 7 to CPU 1 are stored in the accumulator 8 therein and processed by ALU 3. The memory 2, here ROMs' 2a, contains a predetermined set of microprograms previously memorized in preselected steps of EDM parameters which are regulated by the control devices 28, 30 and 32. Thus, three sets of words corresponding to the machining pulse parameters, machining fluid flow rate or pressure and the gap spacing are stored each in the form generally described in connection with FIGS. 2 and 3. The readout of these words can be done in the order of successively memorized addresses or in any other order desired.

The sysytem of FIG. 6 includes an output data distributor 35 which communicates CPU 1 with control devices 29, 31 and 33 which constitutes peripheral units or subsystems and include central processing units 29a, 31a and 33a, respectively each equipped with memories 29b, 31b, 33b. The device 33 thus serves to provess with CPU 33a the output of CPU 1 distributed by the unit 35 and to issue servo-up and servo-down signals to the actuator 32 through interfaces 33c and 33d, respectively. The device 31 serves to process with CPU 31a the output of CPU 1 distributed thereto by the unit 35 and to issue a control signal to the pump 30 through interface 31c. The device 29 serves to provess with CPU 29a the output of CPU 1 distributed thereto by the unit 35 and to issue to the gate circuit 28 on-time and off-time control signals through interfaces 29c and 29d, respectively.

The EDM system illustrated in FIG. 6 is generally of the sinking type and it is apparent that where a wire-cut type EDM machine is to be controlled, an x-y feed unit replaces for the vertical electrode feed 32 and a unit driving the wire electrode axially and an electrode vibrator arrangement may or should be additionally provided for control by CPU 1 through the distributor 35 independently or in conjunction with other controllable devices.

CPU 1 operates to read out instructions and data for gap spacing, machining pulses and dielectric liquid stored in the memory 2 and perform the corresponding series of data processing. The readout and data processing steps are performed in conjunction with the output of the distributor 35. Where a time-sharing data distribution is desired, a suitable set of time divisions may be provided.

The data configuration programmed in the memory 2a may be in the form shown in FIG. 3 for controlling, for example, the EDM gap spacing or machining feed. The data shown comprise eight bits wherein the number of feed drive pulses to be set are appointed as B1=2, B2=10,-B5=100,-B8=1000. The eight bits are read out in parallel with one another and the divided data appear respectively at the corresponding data buses connected to ALU 3 in the CPU 1 and are transmitted to the register therefor. A predetermined bit is thus chosen by data processing.

On the other hand, in CPU 1, the gap numerical data from the input interface 7 are stored in the accumulator 8. The data processing is effected on the contents of the aforementioned register 4 and the accumulator 8. The result is input to the accumulator 8 which issues the processed output.

Figure 7:
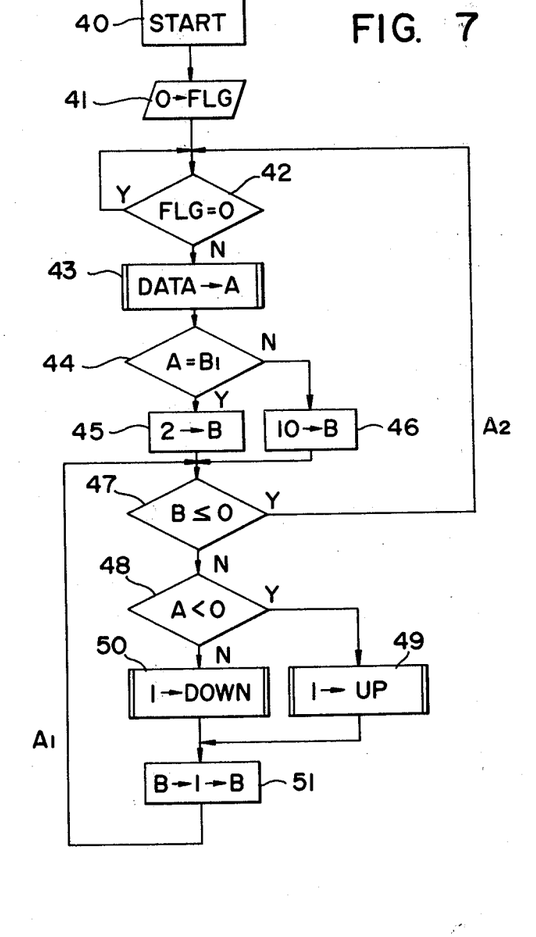
FIG. 7 is a flow chart of certain automatic operations executed by the system of FIG. 6.

FIG. 7 shows a flow chart listing successive functional steps involved in the operation of the system of FIG. 6 for EDM gap control wherein each block represents each procedural step. As in the previous system illustrated in FIG. 4, the operation commences at a start block, here denoted at 40, to actuate the system. In block 41 the flag bit FLG is cleared to advance to block 42 where it is inquired if FLG is 0 or not. Now, if machining is in progress at the EDM gap G, the negative NO is answered and otherwise the positive YES outputs. When NO is the answer, the system is allowed to advance to block 43. Then the machining data A from the gap monitoring unit 5 is memorized in the accumulator 8 and the subsequent block 44 is reached. In the block 15 it is questioned if the data A input to the accumulator 8 is equal to the minimum B1 (=2) of bits transferred from the memory 2a. If A=B1, the output Y (yes) is issued and the system is advanced to block 45 to allow B1=2 to be memorized in the register 4. If A≠B1 or N (no) is the output, other bits B2,-B8 are compared sequentially and the coincident bit, say B2 (=10), is selected for memorization in block 46.

After set-up of the coincident bit, the operation proceeds to block 47 where if the data B stored in the register 4 is 0 or not, or B≦0 is questioned. If N is the answer, block 48 is reached where the polarity of datum A stored in the accumulator 8 is inquired. If A<0, the output Y issues arriving at block 49 to allow an up-signal to be furnished which commands the machining gap G to be enlarged. On the contrary, if A≧, the answer N reaches block 50 to allow a down-signal to be furnished for narrowing the gap spacing G. The system then advances to block 51 where the bit B in the register 4 is stepped down, allowing the loop A1 to be followed for feedback to the block 47. This looping continues and the command pulse is issued repetitively until B≦0. Thus, pulses are issued corresponding in number to the bit B1=2 (or B2=10 or so forth) stored in blocks 45 and 46 in accordance with the input data A. It folows that a particular bit is selected depending upon the input magnitude with the result that an advantageous weighted control mode is effected for a machining parameter to allow the machining status or progress in the gap G to be improved rapidly and with an optimum effectiveness. Weighting with further increases steps is, of course, attained by increasing the number of bits for selection. Here again, the polarity inquiry block 47 for datum B is shown having an additional output which, when B≦0, issues the answer Y which is fed back to the block 42 along the loop A2 to command that new data be drawn from the machining gap G.

In this manner the control system disclosed operates by constantly monitoring change in the gap status and data continuously derived from the machining gap G representing the gap status is microprocessed in CPU 1. The weighted microprocessing by CPU 1 provides output signals which are applied to control devices 29, 31 and 33 through the distributor 35 which serves as a time-sharing unit.

Thus, in a given time division, CPU 33a in the servo control device 33 is selectively responsive to the output of CPU 1 and accumulates received signals to provide, in accordance with the result of data processing, an electrode-advance or electrode-retraction signal which is applied to the actuation unit 32 through interface 33b, 33c. A constantly stable and optimal gap control thus results.

In a subsequent time division, CPU 29a in the pulse control device 29 may be selected for response to the output of CPU 1 and accumulates received signals for processing therein to provide control on either or each of the pulse on-time and on-time control interfaces 29c and 29d which in turn operate the gate circuit 28.

The gate circuit 28 may here comprise a multiple ring counter adapted to turn on and off power transistors 26 sequentially so that a succession of pulse trains individually consisting of elementary pulses of on-time τon and off-time τoff with the pulse trains having a duration Ton and a cut-off time interval Toff are applied across the machining gap G. Thus, the gate circuit 28 in conjunction with interfaces 29c and 29d when operated by CPU 29a in response to the gap status ascertained provides an optimal modification of machining pulses.

The duration Ton is known to determine stock removal and hence a parameter to be chosen to alter machined surface roughness conditions, e.g. roughing and finishing. Appropriate commands for the alteration from a particular graduated roughing condition to another or to a particular graduated finishing condition or vice versa are generated by the data-processing operation of CPU 1 based upon a program stored in the memory 2 in response to a gap status signal developed by the monitoring unit 5.

The quenching of an arc discharge or short-circuiting condition and the removal of machining chips to gain gap decontamination can be achieved during cut-off time intervals Toff which space successive discharge trains from each other. Here again, CPU 1 provides command signals to alter and adjust optimally the train cut-off time interval Toff by choosing the same from preprogrammed values in the memory 2 precisely in response to the indication of the monitoring unit 5.

It may also be necessary to controlledly modify the ratio of Ton and Toff or to change these parameters in combination with the pulse on-time τon, off-time τoff and peak current Ip to meet particular requirements arising from a particular choice of a machining mode, electrode materials, machining configuration, machining depth and so forth.

All necessary information to be selected is stored in advance in the memory unit 2 and successively or appropriately retrieved by CPU 1 in response to the input from the machining gap G to analytically process the contents and then to provide a necessary number of control commands successively so that an optimal machining status is approached.

Advantageously, the train duration Ton can be successively increased within the given range so that a normal machining status may be maintained in the machining gap G. If any abnormormality develops, the duration Ton can be decreased successively. A modified program can be kept to be applied so that a maximum value for the duration may be constantly approached. An optimal value of the cut-off time interval Toff for change in the opposite directions is likewise determined. In the program control of the system, instead of incremental or decremental change over selected values, for a given machining parameter, certain analytical results of input data received may enable skipping over two or three progressive steps in accordance with a correspondingly weighted control program to gain an accelerated achievement of a desired condition.

CPU 31a in the control device 31 for the pump 30 can then be activated in the next time division by the time-sharing distributor 35 to respond to output signals issuing from CPU 1. Thus, for example, when removal of machining chips from the gap region and hence the forced flow of the machining fluid is found to be insufficient by reason of any change in the gap status, the delivery pressure or flow rate of the pump 30 can be increased to restore an optimal gap flushing condition.

One or more additional control devices for other machining parameters may be provided for activation by CPU 1 via the time-sharing unit 35. For example, the axial rate of travel of a wire electrode, the resistance and temperature of machining fluid (i.e. distilled water) and the thickness of a workpiece may be subject to further control in wire-cut EDM.

A cycle of time-divided control for a predetermined number of machining parameters is repeated. Time divisions assigned to individual control operations for different parameters may each be set individually. Thus, the time division for machining pulse control or servo-control may be relatively long. The command for controlling the machining fluid supply may be applied at a frequency much lower than, say one half or one third of that at which the command for pulse control or servo-control is transmitted.

For diverse machining parameters, the time-sharing control by the system disclosed allows achievement of a markedly enhanced machining performance. Machining chips and other products accumulated in the gap are effectively removed during pulse train cut-off time intervals whose duration is controlled adaptively. When the chip removal action by the train interval control is insufficient, the machining gap can be cyclically enlarged to promote the gap washing action by the intermittent electrode retraction unit which is controlled. Subsequently or substantially simultaneously the fluid supply unit can be controlledly activated to increase the fluid pressure and flow rate. These multiple independent control operations are performed on a time-sharing basis under the judgment and direction of a microprocessor to achieve a desired end with a maximum efficiency.

What is claimed:

1. A method of controlling a plurality of different mutually independent machining parameters across a single machining gap in the operation of an EDM machine having a plurality of control devices for variable regulating the different mutually independent machining parameters, respectively, the method comprising the steps of:
microprogramming a set of information each representing a predetermined set of values for each of said different mutually independent machining parameters in a memory of a microprocessing unit;
deriving from said machining gap in said EDM machine a gap status signal representing a measure of characteristic thereof;
applying said gap status signal through a single channel to an input interface and in turn to said microprocessing unit;
cyclically processing said set of microprogrammed information with said gap status signal in said microprocessing unit while applying predetermined weights to said parameters, respectively, during microprocessing to provide through an output interface a plurality of control signals each individually representing a respective command to retrieve a preselected one of said predetermined set of values of each of said different mutually independent machining parameters in each of said control devices;

applying the resulting plurality of control signals to said plurality of control devices, respectively, so that each control device individually establishes said retrieved value of the particular parameter.

2. A method of controlling a plurality of different mutually independent machining parameters across a single machining gap in the operation of an EDM machine having a plurality of control devices for variably regulating said different mutually independent machining parameters, respectively, the method comprising the steps of:

microprogramming a set of information each representing a predetermined set of values for each of said different mutually independent machining parameters in a memory of a microprocessing unit;

deriving from said machining gap in said EDM machine a gap status signal representing a measure of characteristic thereof;

applying said gap status signal through a single channel to an input interface and in turn to said microprocessing unit;

cyclically processing said set of microprogrammed information with said gap status signal in said microprocessing unit to provide through an output interface a plurality of control signals each individually representing a respective command to retrieve a preselected one of said predetermined set of values of each of said different mutually independent machining parameters in each of said control devices;

applying said control signals to said control devices, respectively, and dividing a control period into a series of segments and time-sharing over said segments through said output interface said control signals to be applied to the respective control devices.

3. An apparatus for controlling a plurality of different mutually independent machining parameters in the operation of an EDM machine having a single machining gap and a plurality of control devices for variably regulating said different mutually independent machining parameters, respectively, the apparatus comprising:

a microprocessor unit having a memory for storing therein a set of programmed information each individually representing a predetermined set of values for each of said different mutually independent machining parameters;

gap monitoring means for deriving from said machining gap in said EDM machine a gap status signal representing a measure of characteristic thereof;

an input interface connected with said monitoring means through a single channel for applying said gap status signal to said microprocessing unit;

means associated with said microprocessor unit for cyclically processing said set of programmed information with said gap status signal to provide through an output interface a plurality of control signals each individually representing a command to retrieve a preselected one of said predetermined set of values of each of said different mutually independent machining parameters in each particular of a said control devices;

means associated with said microprocessor unit for applying predetermined weights to said parameters respectively, during microprocessing by said unit to provide said control signals.

4. An apparatus for controlling a plurality of different mutually independent machining parameters in the operation of an EDM machine having a single machining gap and a plurality of control devices for variably regulating said different mutually independent machining parameters, respectively, the apparatus comprising:

a microprocessor unit having a memory for storing therein a set of programmed information each individually representing a predetermined set of values for each of said different mutually independent machining parameters;

gap monitoring means for deriving from said machining gap in said EDM machine a gap status signal representing a measure of characteristic thereof;

an input interface connected with said gap monitoring means through a single channel for applying said gap status signal to said microprocessing unit;

means associated with said microprocessing unit for cyclically processing said set of programmed information with said gap status signal to provide through an output interface a plurality of control signals each individually representing a command to retrieve a preselected one of said predetermined set of values of each of said different mutually independent machining parameters in each particular of said control devices; and time-sharing means associated with said output interface for distributing said control signals in preset time divisions to said control devices, respectively.

5. The method defined in claim 2 wherein said parameters are weighted during microprocessing by said unit to provide said respective control signals.

6. The apparatus defined in claim 4 wherein said microprocessor unit is adapted to weight said parameters therein to provide said control signals.

7. The apparatus defined in claim 4, further comprising a central processing unit independent of said microprocessor associated with at least one of said control devices for processing signals delivered thereto.

8. The apparatus defined in claim 7 wherein each of said control devices is provided with a respective central processing unit.

* * * * *